United States Patent
Cai et al.

(10) Patent No.: US 7,035,391 B2
(45) Date of Patent: Apr. 25, 2006

(54) COMMUNICATION OF INTELLIGENT NETWORK SIGNALING BETWEEN A SSP AND AN EXTERNAL INTELLIGENT PERIPHERAL

(75) Inventors: Yigang Cai, Naperville, IL (US); Xu Chen, QingDao (CN); Ning-Yin Chou, Naperville, IL (US); Valentin Mircea Hossu, Winfield, IL (US); Chitresh Kumar Yadav, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 812 days.

(21) Appl. No.: 09/808,934

(22) Filed: Mar. 15, 2001

(65) Prior Publication Data

US 2001/0053158 A1 Dec. 20, 2001

Related U.S. Application Data

(60) Provisional application No. 60/204,035, filed on May 15, 2000.

(51) Int. Cl.
*H04M 7/00* (2006.01)
(52) U.S. Cl. ............... 379/221.11; 379/221.08; 379/221.09; 379/221.1
(58) Field of Classification Search ........... 379/221.11, 379/221.1, 221.09, 221.08
See application file for complete search history.

(56) References Cited

U.S. PATENT DOCUMENTS

| 5,386,412 | A | * | 1/1995 | Park et al. ............ 370/270 |
| 6,064,729 | A | | 5/2000 | Cookson |
| 6,226,289 | B1 | * | 5/2001 | Williams et al. ........ 370/385 |
| 6,769,026 | B1 | * | 7/2004 | Casile et al. .......... 709/227 |

OTHER PUBLICATIONS

Bale, M. C., "Signalling ain the Intelligent Network", BT Technology Journal, BT Laboratories, GB, vol. 13, No. 2, Apr. 1, 1995 pp. 30-42.

* cited by examiner

Primary Examiner—Ahmad F. Matar
Assistant Examiner—Karen Le

(57) ABSTRACT

Communication between a service switching point (SSP) and an external (or stand alone) Intelligent Peripheral (IP) has not been defined by any of the standard bodies. ITU-T Q.1600 and ETSI 300 374-1 defines the network configuration of SCP, SSP and stand-alone IP units using SS7 ISUP connection, but ITU-T Q.1600 and ETSI 300 374-1 does not specify in detail the SS7 ISUP messages for bi-directional communication between a SSP and an IP unit. This invention details the message flow between a SCP, a SSP and an ISUP IP unit, especially in the messages between the SSP and IP unit using SS7 ISUP protocol. With the signaling method of the present invention, SCP can send INAP operations, such as PA, PCUI to instruct an external IP unit to play an announcement or collect user information, then an IP unit can send back the related operations back to SCP. In this case, the resource of the IP unit can be shared by other switches and SSPs in the network.

6 Claims, 6 Drawing Sheets

COMMUNICATION OF INTELLIGENT NETWORK SIGNALING BETWEEN A SSP AND AN EXTERNAL INTELLIGENT PERIPHERAL

CROSS-REFERENCE TO RELATED APPLICATION

This application claims priority of Provisional Application Ser. No. 60/204,035, which was filed May 15, 2000.

TECHNICAL FIELD

This invention relates to telecommunication networks and more particularly to telecommunication networks that have an intelligent network service switching point (SSP) connected to an intelligent network service control point (SCP) via Intelligent Network Application Part (INAP) protocol and also to an external (or stand alone) Intelligent Peripheral (IP) via INAP or ISUP (ISDN user part) protocol.

BACKGROUND OF THE INVENTION

As FIG. 1 shows, it is common in a network 10 for circuit switched units, such as SSP 12 and SCP 14, to be connected with an external (or stand alone) Intelligent Peripheral (IP), such as external IP 16. The existence of SSP 12 and SCP 14 denotes that the network 10 is an intelligent network (IN), meaning that advanced services are available to network subscribers who want them. In the intelligent network 10, the external IP 16 may be used to perform functions that are IN related, such as play announcement and collect user information (PACUI). All the resources in external IP can be shared with other SSP/switches in the network (not shown) as long as there are appropriate links between them.

As shown in FIG. 1, the existing way for SCP 14 to communicate with external IP 16 is through a direct INAP link 18 between SCP 14 and external IP 16. Such an arrangement is defined in both ITU (International Telecommunication Union) and ETSI (European Telecommunication Standards Institute) standards.

ITU and ETSI standards also generally define another arrangement for a SCP and an external IP in which there is not any direct communication link between a SCP and an external IP. All the messages between SCP and external IP, in this configuration, are then relayed by the SSP that connect to both SCP and the external IP. Such an arrangement is called the SSP Relay Configuration and the SSP of such an arrangement is called the Relay SSP. Other SSP/switches can access the external IP either through the link via the relay SSP or through the direct ISUP/Voice trunk with the external IP.

Although ITU and ETSI standards generally define the SSP Relay Configuration, there is currently no standard describing the exchange of messages between the external IP and the SCP in a SSP Relay Configuration network. Thus, there is a need in the art for a SSP Relay Configuration network that has functioning communications between an SCP and an external IP. There is also a need in the art for a method of communicating between a SCP and an external IP in a SSP Relay Configuration network.

SUMMARY OF THE INVENTION

Briefly stated, in accordance with one aspect of the invention, the aforementioned problems are addressed and an advance in the art achieved by providing a method for communicating between a service control point (SCP), a service switching point (SSP) and an external Intelligent Peripheral (IP). This method includes the step of establishing a connection between the SSP and the external IP. Then while the connection between the SSP and the IP is established, transporting an Intelligent Network Application Part (INAP) operation inside a pass along message between the SSP and the IP. In response to the INAP operation inside the pass along message, the IP performs the INAP operation transported by the pass along message.

In accordance with another aspect of the invention, the aforementioned problems are addressed and an advance in the art achieved by providing a method for communicating between a service control point (SCP), a service switching point (SSP) and an external Intelligent Peripheral (IP). The method includes the steps of: establishing a voice path connection between the SCP and the SSP; sending a connect to resource request (CTR) from the SCP to the SSP for setting up a path to access an IP resource at the external IP; sending an initial address message (IAM) from the SSP to the external IP to setup the path, with address digits of an ipRoutingAddress of the CTR being mapped into a called party number in the IAM; and sending back an address complete (ACM) message from the external IP and a second voice path is established between the SSP and the external IP. Next, the method includes sending a play announcement (PA) message from the SCP to the external IP for playing an announcement; copying an INAP operation PA from the SSP into a pass along message (PAM) without decoding the operation, and sending the PAM to the external IP; decoding by the IP the PAM and handling the play announcement operation; sending an SRR operation in another PAM from the external IP to the SSP. Next, the method has the steps of: extracting by the SSP the SRR from the another PAM and sending the SRR back to the SCP without decoding it; sending a DFC from the SCP to the SSP to disconnect the external IP; sending a release (REL) message from the SSP to the external IP to release the second voice path connection; releasing the second voice path by the external IP in response to the REL from the SSP; and returning by the external IP a release complete (RLC) message back to the SSP to acknowledge the release.

DETAILED DESCRIPTION

Figure 1:
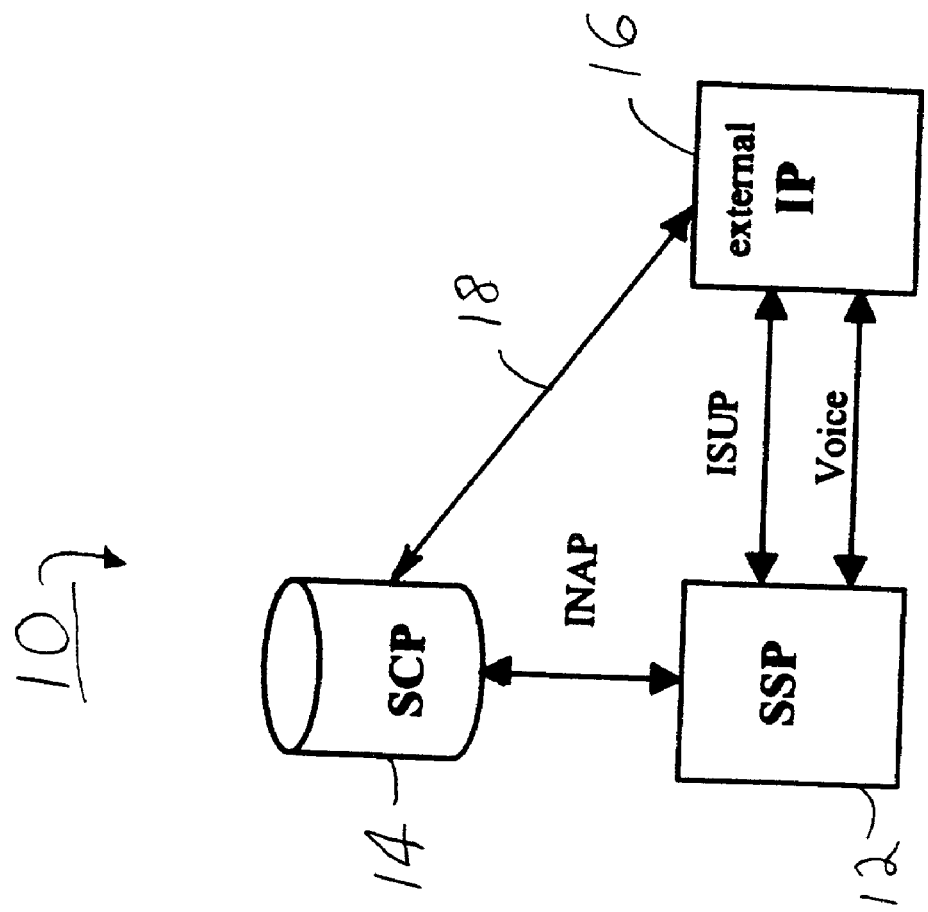
FIG. 1 is a block diagram of a known intelligent network arrangement.
Figure 2:
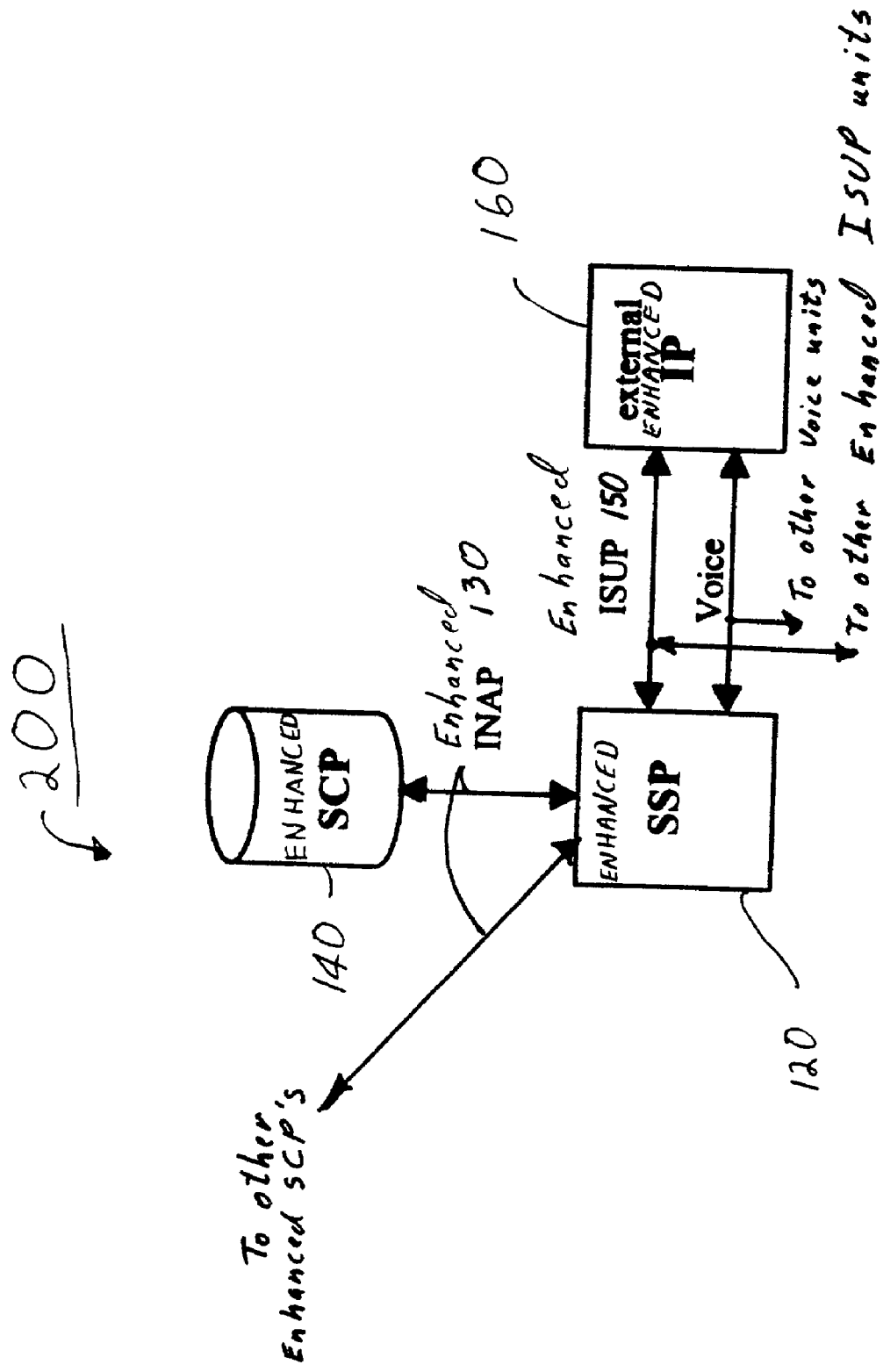
FIG. 2 is a block diagram of an embodiment of the present invention.

FIG. 2 is a diagram of a network 200 that has an enhanced SSP 120 that is connected to an enhanced SCP 140 and to an enhanced external IP 160. The network 200 is a public telecommunication network furnished with intelligent network (IN) system, similar to the network shown in FIG. 1, except that network 200 has enhanced communication capabilities and protocols over enhanced INAP links 130 and enhanced ISUP links 150. These enhanced capabilities and protocols are in addition to and compatible with both ITU and ETSI INAP. The enhanced SSP 120 and external IP 160 support ISUP signaling (ITU Blue Book or White Book ISUP), while supporting the enhanced ISUP protocol that provides for the communication of the relay-SSP signaling to the enhanced external IP 160 and other similar signaling. The enhanced external IP 160 has special resource functions (SRF) provide functionality such as voice announcements, voice recognition, DTMF digit collection, and tone generator. Because of the enhanced relay SSP signaling, enhanced SCP(s) 140 can use the SRF of enhanced external IP 160 without the need for a direct link between them as that shown in FIG. 1.

Figure 4:
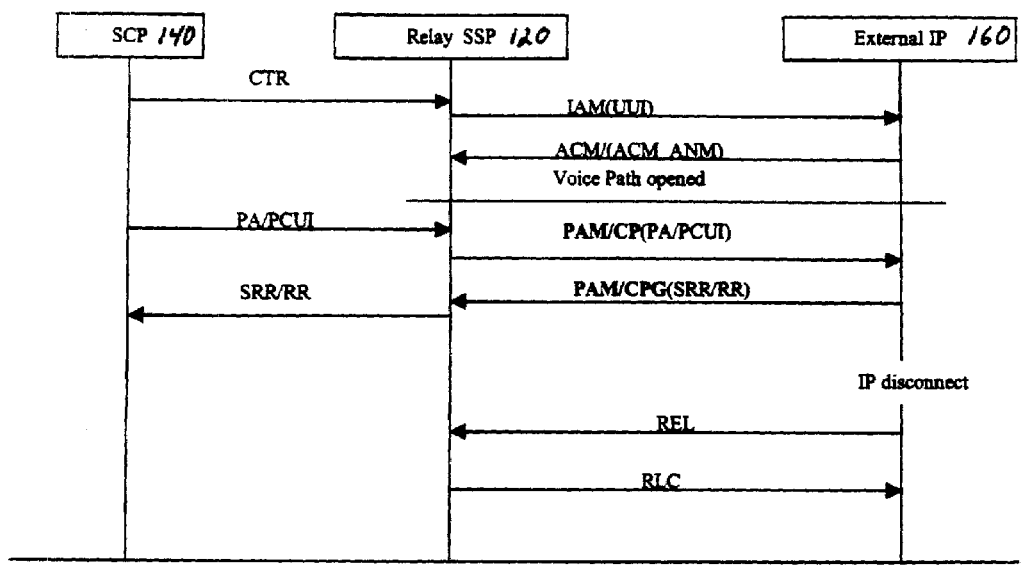
FIG. 4 is a flow diagram according to another aspect of the invention.
Figure 5:
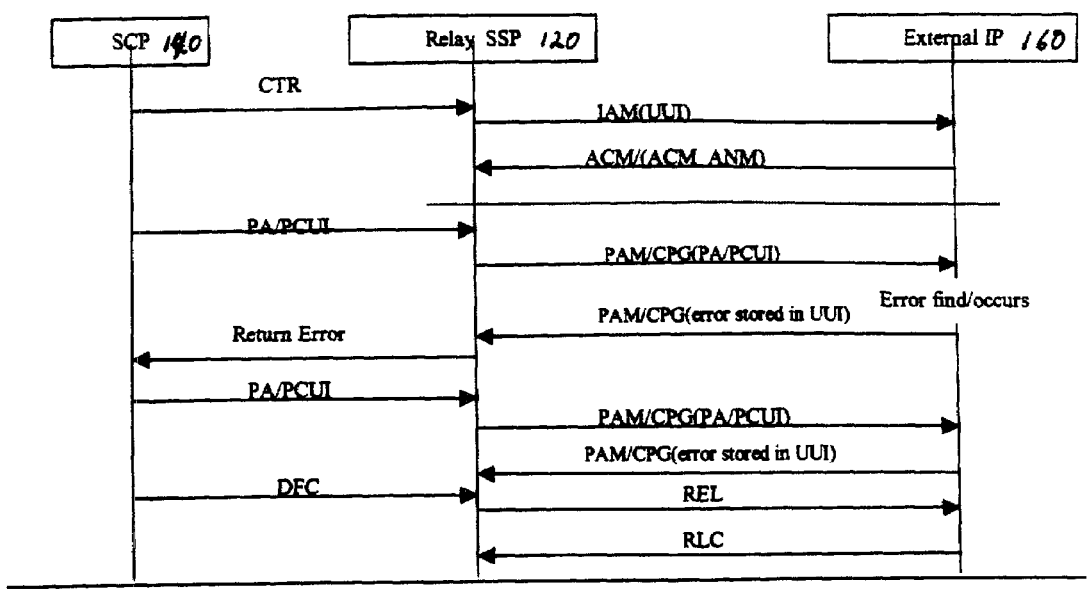
FIG. 5 is a flow diagram according to another aspect of the invention.
Figure 6:
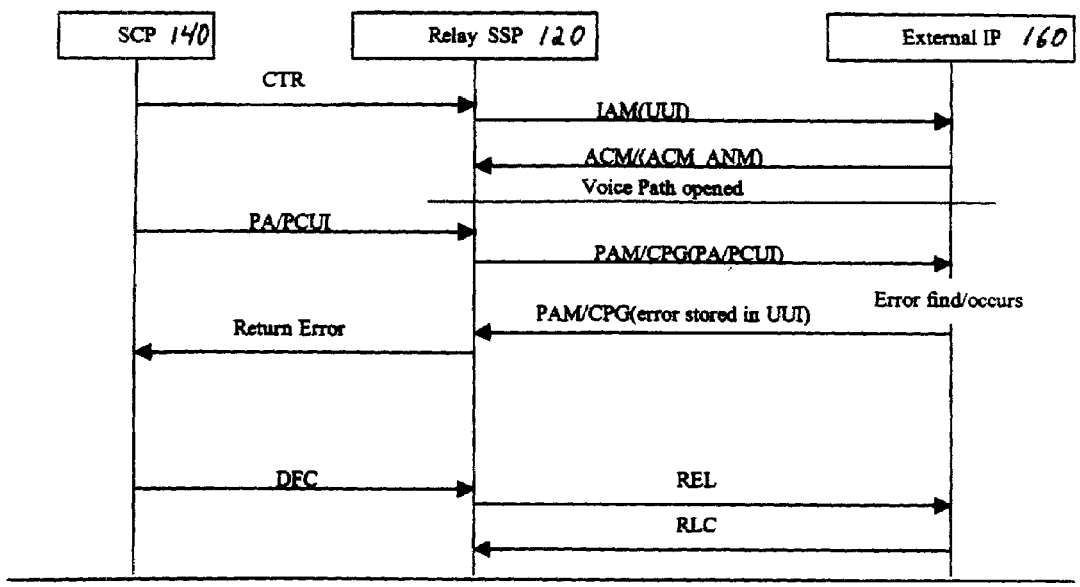
FIG. 6 is a flow diagram according to another aspect of the invention.

Referring now to FIGS. 4–6, examples of communications between an enhanced SCP 140, an enhanced relay SSP 120 and an enhanced external IP 160 are shown and described. It is worth noting that according to a preferred embodiment of the invention there are two ways to transfer INAP operations between enhanced SCP 140 and enhanced external IP 160 through enhanced ISUP trunks 150 using ISUP messages.

1. Send INAP operations in Pass Along Message (PAM).

While the connection between the SSP and the IP is up the INAP operations are transported inside the PAM.

Pass Along Message:

The PAM can be sent in either direction to transfer information between two signaling points. The format of the message is:

| Parameter | Type | Length |
| --- | --- | --- |
| Message Type | Fixed | 1 byte |
| Optional Part | Variable | 2–257 bytes |

The INAP operation will be stored in the Optional Part of the message and delivered to the destination. Currently, the length of an INAP operations is less than 200 bytes, so the optional part is enough for storing INAP information. This enhanced PAM adds a new purpose to this message to communicate with an enhanced SSP 120 and/or an enhanced external IP 160. Enhanced SSP 120 and enhanced external IP 160 are capable because of their enhancements in this protocol area to use this message to transfer play announcement (PA), prompt and collect user information (PCUI), return report (RR), and specialized resource report (SRR) requests between enhanced SCP 140 and enhanced external IP 160. Without the enhancements, SCP 140 would have no place to put such requests and external IP 160 would have no place to receive such requests.

2. Send INAP operations in UUI parameter in CPG message.

This embodiment of the invention solution uses the User to User Information (UUI) optional parameter in a Call Progress (CPG) message to transport the INAP operations in both directions while the connection between the SSP 120 and the external IP 160 is up. This parameter in the CPG message has a size of 3 to 131 bytes.

After a call set up, SSP 120 and external IP 160 can store any PA/PCUI and other INAP operations into the UUI parameter of the CPG message. Since the CPG can be sent multiple times, if the INAP operations to be communicated exceeds 129 bytes, SSP 120 and external IP 160 can package the operation into several CPG messages and then send them.

The examples that follow include PAM messages, CPG/UUI messages or both.

Figure 3:
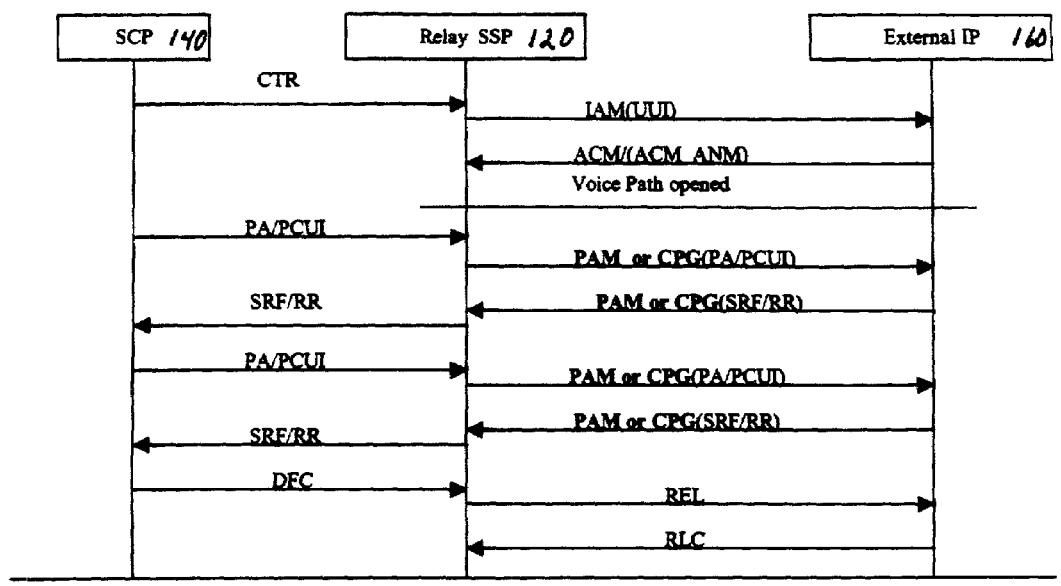
FIG. 3 is a flow diagram according to one aspect of the invention.

Voice Path is established and the connection is released by SCP 140 (FIG. 3)

(1) SCP 140 sends connect to resource request (CTR) to relay SSP 120 for setting up the path to access the IP resource at external IP 160.

(2) SSP 120 sends an initial address message (IAM) to IP 160 to setup the path. The address digits in the ipRoutingAddress of CTR will be mapped into the called party number in the IAM. UUI parameter in IAM can contain additional information from SCP 140.

(3) IP 160 sends back an address complete (ACM) message and the voice path is established between SSP 120 and external IP 160. IP 160 may send an answer (ANM) message also.

(4) SCP 140 sends PA to IP 160 for playing announcement PA, or PCUI for IP 160 to prompt and collect user information.

(5) SSP 120 copies INAP operations (PA/PCUI) in the PAM/CPG(UUI) message without decoding the operation, and sends it to IP 160

(6) IP 160 decodes the PAM/CPG message and handles the PA/PCUI operation.

(7) IP 160 sends SRR or RR operation in the PAM/CPG message, to SSP 120.

(8) SSP 120 extracts the SRR or RR from PAM/CPG message and sends them back to SCP 140 without decoding it.

(9) SCP 140 then sends a disconnect forward connection (DFC) operation to SSP 120 to disconnect the external IP 160.

(10) SSP 120 sends a release (REL) message to IP 160 to release the connection, which IP 160 does, and IP 160 returns release complete (RLC) back to acknowledge the release. The voice path is disconnected.

Voice Path is established and the connection is released by external IP 160, (FIG. 4)

(1) SCP 140 sends CTR to relay SSP 120 for setting up the path to access an IP resource at IP 160.

(2) SSP 120 sends IAM to IP 160 to setup the path. The address digits in the ipRoutingAddress of CTR will be mapped into the called party number in the IAM. UUI parameter in IAM can contain additional information from SCP 140.

(3) IP 160 sends back ACM message and the voice path is established between SSP 120 and external IP 160 . External IP 160 may send ANM message also.

(4) SCP 140 sends PA to IP 160 for playing announcement, or PCUI for IP to prompt and collect user information.

(5) SSP 120 copies INAP operations (PA/PCUI) in the PAM/CPG(UUI) message without decoding the operation, and sends it to external IP 160

(6) External IP 160 decodes the PAM/CPG message and handles the PA/PCUI operation.

(7) External IP 160 sends SRR or RR operation in the PAM/CPG message, to SSP 120.

(8) SSP 120 extracts the SRR or RR from PAM/CPG message and sends them back to SCP 140 without decoding it.

(9) If external IP 160 is allowed to disconnect itself based on disconnectFromIPForbidden parameter in PA/PCUI, after all the announcements/digit collection is completed, external IP 160 sends REL message to the SSP 120 to release the connection between SSP 120 and external IP 160.

(10) SSP 120 returns RLC to external IP 160 and the voice path is disconnected
IP 160 find errors in the PA/PCUI operation and return error back to SCP 120. (FIGS. 5 and 6)
(1) SCP 140 sends CTR to SSP 120 for setting up the path to access the IP resource at external IP 160.
(2) SSP 120 sends IAM to external IP 160 (UUI parameter can contain additional information from SCP).
(3) External IP 160 sends back ACM/ANM message and the voice path is setup between SSP 120 and external IP 160.
(4) SCP 140 sends PA to external IP 160 for playing announcement, or PCUI for external IP 160 to prompt and collect user info.
(5) SSP 120 put INAP operation PA/PCUI in the PAM/CPG message without touch it, and sends it to IP 160.
(6) External IP 160 decodes the PAM/CPG message, and find errors in the PA/PCUI operations, external IP 160 puts the related errors (Such as Missing parameter) into an error message and put it into the PAM/CPG message to SSP 120.
(7) SSP 120 decodes the PAM/CPG message and gets the error message, then sends it to SCP 140 without touching it.
(8) SCP 140 can either re-send another PA/PCUI (in FIG. 5) to external IP 160 or release the connection (FIG. 6).

Thus, with the above examples, the essential operations of the enhanced signaling and messaging capabilities of the current invention are disclosed and discussed. As shown in FIG. 2, other SSPs or equivalent units (not shown) can communicate to enhanced external IP 160 via enhanced ISUP 150 by the enhanced signaling and messaging capabilities. Similarly, other SCPs (not shown) may be connected to SSP 120 and using enhanced INAP signaling and messaging capabilities of the present invention communicate to the enhanced external IP 160. All while still maintaining compatibility with underlying ITU and INAP standards.

Although this invention has been described with respect to preferred embodiments, those skilled in the art may devise numerous other arrangements without departing from the scope of the invention as defined in the following recitations of the invention. For example, a stand alone Intelligent Peripheral could be substituted for the external IP. The attached claims are meant to cover all such minor variations which do not depart from the scope and spirit thereof.

What is claimed is:

1. A method for communicating between a service control point (SCP), a service switching point (SSP) and an external intelligent Peripheral (UP), comprising the steps of:

establishing a voice path connection between SCP and SSP;

sending a connect to resource request (CTR) from the SCP to the SSP for setting up a path to access an IP resource at the external IP;

sending an initial address message (IAM) from the SSP to the external IP to setup the path, with address digits of an ipRoutingAddress of said CTR being mapped into a called party number in the IAM;

sending back an address complete (ACM) message from the external IP and a second voice path is established between the SSP and the external IP;

sending a play announcement (PA) message from the SCP to the external IP for playing an announcement;

copying an Intelligent Network Application Part (INAP) operation PA from the SSP into a pass along message (PAM) without decoding the operation, and sending the PAM to the external IP;

decoding by the external IP the PAM and handling the play announcement operation;

sending a Specialized Resource Report (SRR) operation in another PAM from the external IP to the SSP;

extracting by the SSP the SRR from the another PAM and sending the SRR back to the SCP without decoding;

sending a Disconnect Forward Connection (DFC) from the SCP to the SSP to disconnect the external IP;

sending a release (REL) message from the SSP to the external IP to release the second voice path connection, releasing said second voice path by the external IP in response to said REL from the SSP; and returning by the external IP a release complete (RLC) message back to the SSP to acknowledge the release.

2. The method of claim 1, further comprising the step of disconnecting said voice path by said SCP.

3. The method of claim 2, wherein said IP sends an answer message (ANM) as well as said SRR.

4. The method of claim 2, wherein an UUI parameter of said IAM contains additional information from said SCP.

5. The method of claim 2, wherein said INAP operation is relayed between said SCP and said IP without a direct link between them.

6. The method of claim 2, wherein the SSP uses a plurality of signaling methods to set up the voice path to the IP.

* * * * *